United States Patent
Baughman et al.

(10) Patent No.: US 11,517,825 B2
(45) Date of Patent: Dec. 6, 2022

(54) AUTONOMIC CLOUD TO EDGE COMPUTE ALLOCATION IN TRADE TRANSACTIONS

(71) Applicant: International Business Machines Corporation, Armonk, NY (US)

(72) Inventors: Aaron K. Baughman, Cary, NC (US); Sai Krishna Reddy Gudimetla, Jersey City, NJ (US); Micah Forster, Round Rock, TX (US); Corey Shelton, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 17/039,358

(22) Filed: Sep. 30, 2020

(65) Prior Publication Data
US 2022/0096940 A1   Mar. 31, 2022

(51) Int. Cl.
*A63F 13/828* (2014.01)
*G06N 20/00* (2019.01)
*H04L 67/63* (2022.01)

(52) U.S. Cl.
CPC .......... *A63F 13/828* (2014.09); *G06N 20/00* (2019.01); *H04L 67/63* (2022.05)

(58) Field of Classification Search
None
See application file for complete search history.

(56) References Cited

U.S. PATENT DOCUMENTS

| | | | |
|---|---|---|---|
| 8,219,477 B2 | 7/2012 | Subbu et al. | |
| 8,369,970 B2 | 2/2013 | Allen et al. | |
| 8,554,898 B2 | 10/2013 | Chess et al. | |
| 11,189,382 B2* | 11/2021 | Xu | H04L 67/12 |
| 2009/0313631 A1 | 12/2009 | De Marzo et al. | |
| 2012/0283858 A1 | 11/2012 | Lapadula | |
| 2016/0296843 A1 | 10/2016 | Stickel | |

(Continued)

FOREIGN PATENT DOCUMENTS

| CN | 107977738 A | 5/2018 |
|---|---|---|
| JP | 2016161967 A | 9/2016 |

OTHER PUBLICATIONS

Iima et al., Multi-objective reinforcement learning for acquiring all Pareto optimal policies simultaneously—Method of determining scalarization weights, 2014 IEEE International Conference on Systems, Man, and Cybernetics Oct. 5-8, 2014, San Diego, CA, USA.

(Continued)

*Primary Examiner* — Ronald Laneau
(74) *Attorney, Agent, or Firm* — Garg Law Firm, PLLC; Rakesh Garg; Michael O'Keefe

(57) ABSTRACT

A computer-implemented method and system for autonomic cloud to edge compute allocations in a sports fantasy league trade transaction. The computer implemented method includes, in one embodiment, calculating, based on an expected return associated with each player on each of a plurality of teams in a fantasy sports league, a valuation for each player. An embodiment includes determining a positional need for each of the plurality of teams in the fantasy sports league, and determining, based on the valuation for each player and the positional need for each team, one or more players to include in a trade with another team of the plurality of teams.

20 Claims, 13 Drawing Sheets

(56) References Cited

U.S. PATENT DOCUMENTS

2017/0165581 A1\* 6/2017 McAuley ............... A63F 13/32
2020/0379805 A1\* 12/2020 Porter ............... G06F 16/24568

OTHER PUBLICATIONS

Wang et al., Convex Hull-Based Multiobjective Genetic Programming for Maximizing Receiver Operating Characteristic Performance, IEEE Transactions on Evolutionary Computation, vol. 19, No. 2, Apr. 2015.

Thomason et al., Parameter Optimisation for Location Extraction and Prediction Applications, IEEE, 2015.

Aldhalaan et al., Autonomic Allocation of Communicating Virtual Machines in Hierarchical Cloud Data Centers, 2014 IEEE International Conference on Cloud and Autonomic Computing.

Borjesson et al., Continuing professional development by practitioner integrated learning, OOPSLA'07 Oct. 21-25, 2007.

Erol et al., Linking multimedia presentations with their symbolic source documents: algorithm and applications, Multimedia '03 Proceedings of the eleventh ACM international conference on Multimedia, pp. 498-507, 2003.

Social Computing Research Group, Understanding computer mediated social experience: implications for CSCL, 2005.

Lee, Determining an Optimal Mix of Hybrid Cloud Computing for Enterprises, UCC '17 Companion Companion Proceedings of the 10th International Conference on Utility and Cloud Computing, pp. 53-58, 2017.

\* cited by examiner

*Fig. 9*

TEAM PAIRING

1 : THE SYSTEM:
    1. CALCULATES THE OVERALL STRENGTH OF THE TOP 300 PLAYERS.
    2. DETERMINES EACH TEAM ROSTER NEEDS FOR ALL POSITIONS.
    3. COMBINES 1 AND 2 TO DETERMINE THE RELATIVE VALUE OF EACH PLAYER TO EACH TEAM ROSTER.
    4. RECOMMEDS TRADERS IN EFFORT TO MAXIMIZE OVERALL LEAGUE VALUE.

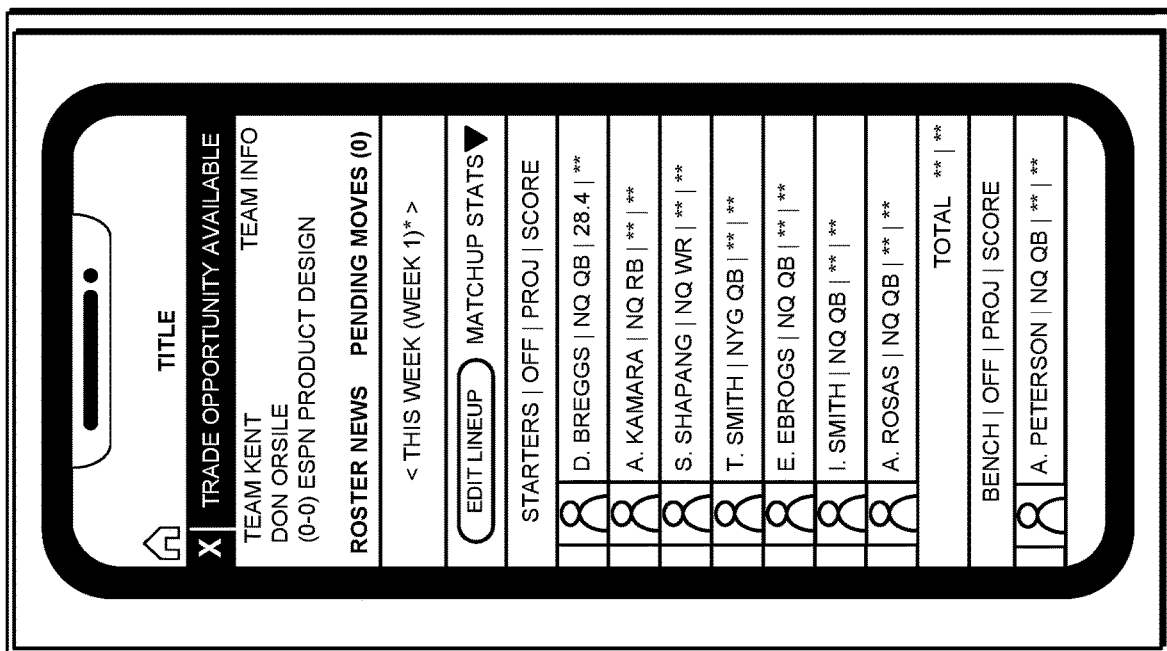

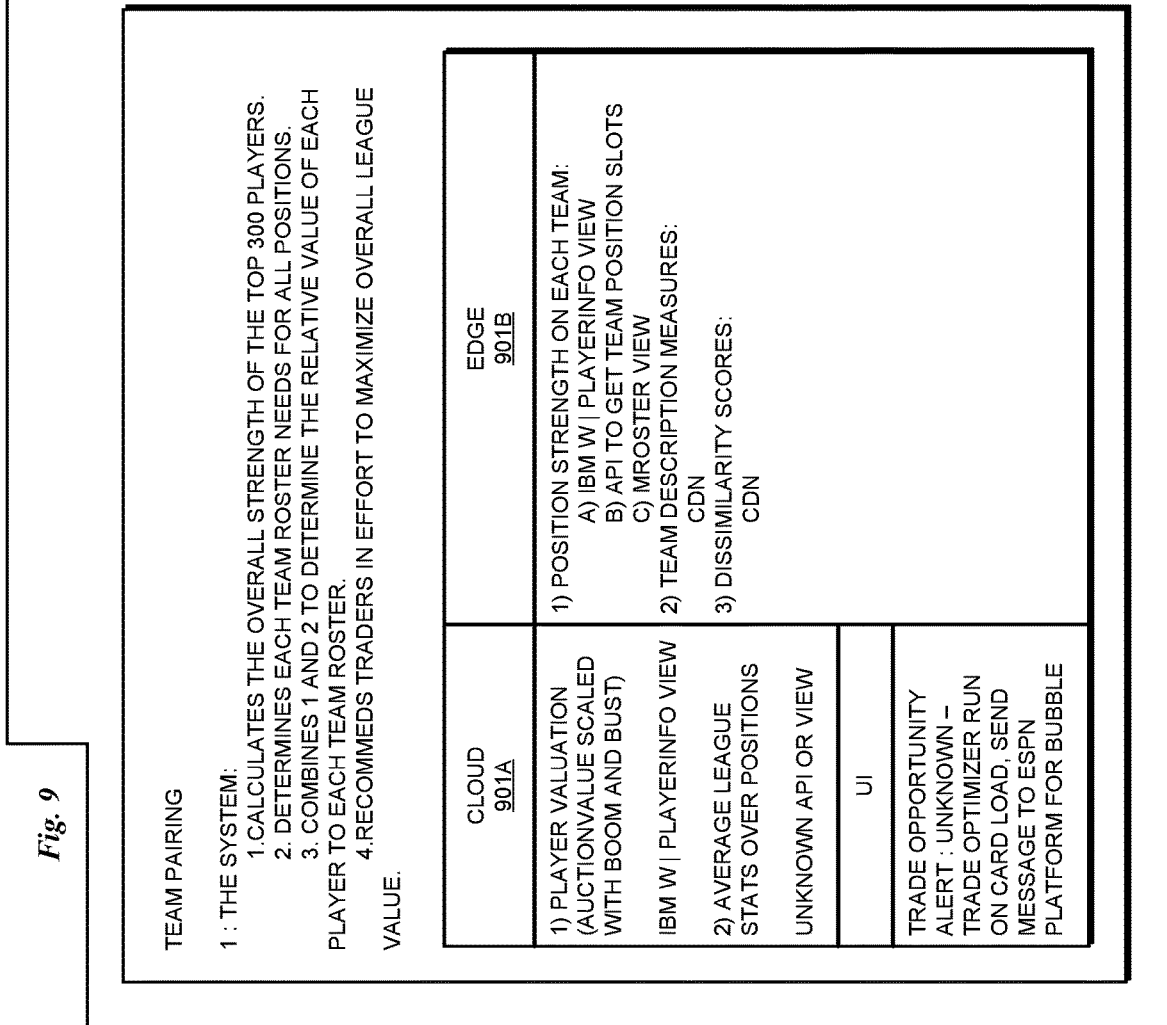

| CLOUD 901A | EDGE 901B |
|---|---|
| 1) PLAYER VALUATION (AUCTIONVALUE SCALED WITH BOOM AND BUST) IBM W | PLAYERINFO VIEW | 1) POSITION STRENGTH ON EACH TEAM: <br> A) IBM W | PLAYERINFO VIEW <br> B) API TO GET TEAM POSITION SLOTS <br> C) MROSTER VIEW |
| 2) AVERAGE LEAGUE STATS OVER POSITIONS | 2) TEAM DESCRIPTION MEASURES: <br> CDN |
| UNKNOWN API OR VIEW | 3) DISSIMILARITY SCORES: <br> CDN |

UI

TRADE OPPORTUNITY ALERT : UNKNOWN – TRADE OPTIMIZER RUN ON CARD LOAD, SEND MESSAGE TO ESPN PLATFORM FOR BUBBLE

*Fig. 10*

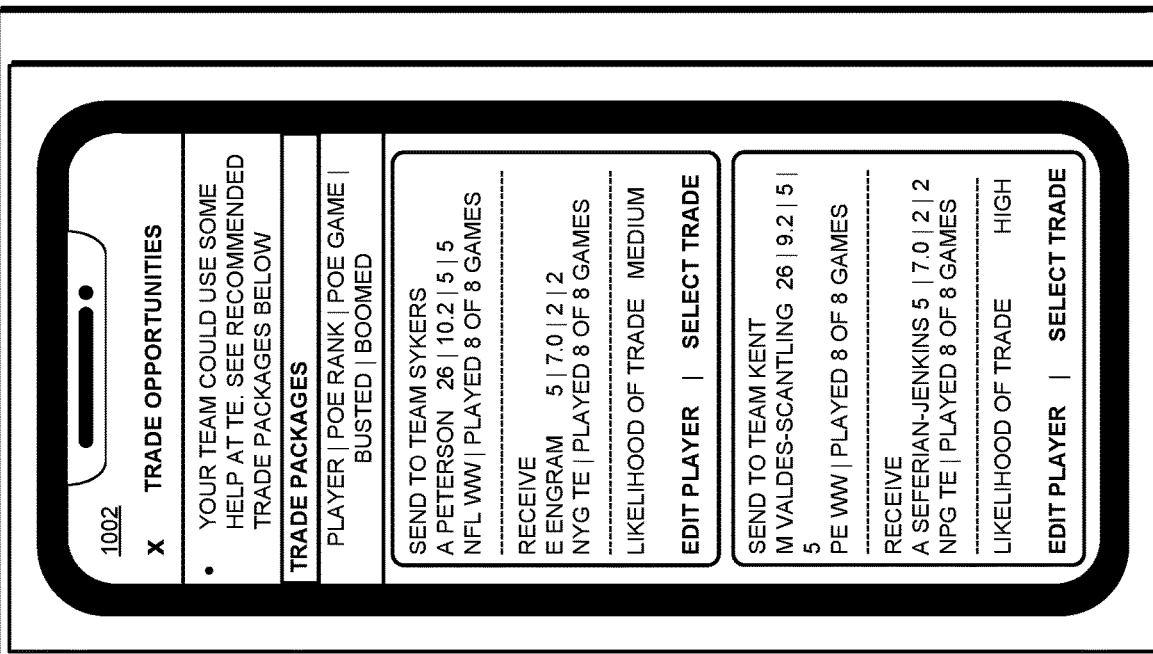

1002
× TRADE OPPORTUNITIES

• YOUR TEAM COULD USE SOME HELP AT TE. SEE RECOMMENDED TRADE PACKAGES BELOW

TRADE PACKAGES

PLAYER | POE RANK | POE GAME | BUSTED | BOOMED

SEND TO TEAM SYKERS
A PETERSON  26 | 10.2 | 5 | 5
NFL WW | PLAYED 8 OF 8 GAMES

RECEIVE
E ENGRAM   5 | 7.0 | 2 | 2
NYG TE | PLAYED 8 OF 8 GAMES

LIKELIHOOD OF TRADE  MEDIUM

EDIT PLAYER  |  SELECT TRADE

SEND TO TEAM KENT
M VALDES-SCANTLING  26 | 9.2 | 5 | 5
PE WW | PLAYED 8 OF 8 GAMES

RECEIVE
A SEFERIAN-JENKINS 5 | 7.0 | 2 | 2
NPG TE | PLAYED 8 OF 8 GAMES

LIKELIHOOD OF TRADE     HIGH

EDIT PLAYER  |  SELECT TRADE

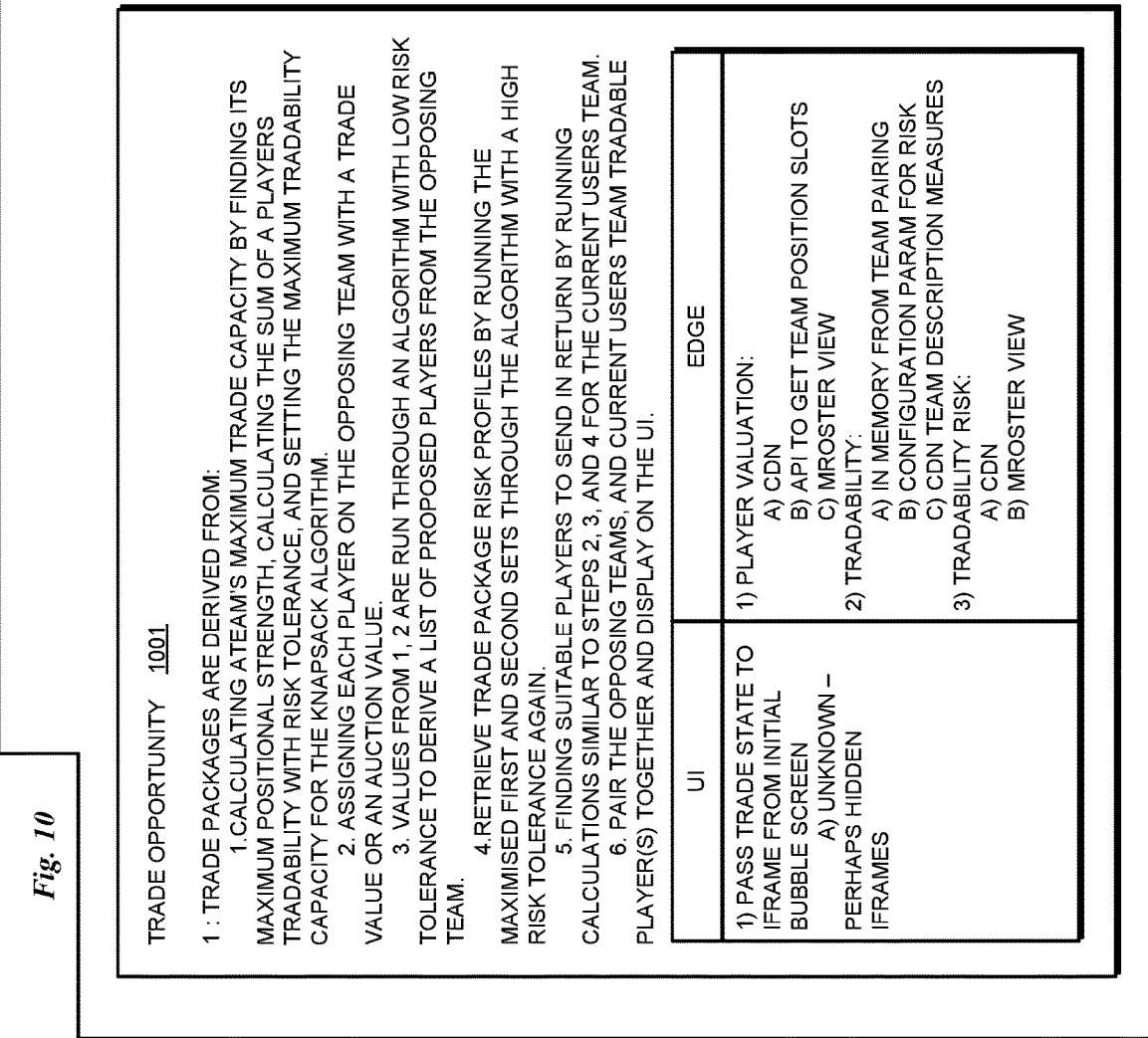

TRADE OPPORTUNITY  1001

1 : TRADE PACKAGES ARE DERIVED FROM:
  1. CALCULATING A TEAM'S MAXIMUM TRADE CAPACITY BY FINDING ITS MAXIMUM POSITIONAL STRENGTH, CALCULATING THE SUM OF A PLAYERS TRADABILITY WITH RISK TOLERANCE, AND SETTING THE MAXIMUM TRADABILITY CAPACITY FOR THE KNAPSACK ALGORITHM.
  2. ASSIGNING EACH PLAYER ON THE OPPOSING TEAM WITH A TRADE VALUE OR AN AUCTION VALUE.
  3. VALUES FROM 1, 2 ARE RUN THROUGH AN ALGORITHM WITH LOW RISK TOLERANCE TO DERIVE A LIST OF PROPOSED PLAYERS FROM THE OPPOSING TEAM.
  4. RETRIEVE TRADE PACKAGE RISK PROFILES BY RUNNING THE MAXIMISED FIRST AND SECOND SETS THROUGH THE ALGORITHM WITH A HIGH RISK TOLERANCE AGAIN.
  5. FINDING SUITABLE PLAYERS TO SEND IN RETURN BY RUNNING CALCULATIONS SIMILAR TO STEPS 2, 3, AND 4 FOR THE CURRENT USERS TEAM.
  6. PAIR THE OPPOSING TEAMS, AND CURRENT USERS TEAM TRADABLE PLAYER(S) TOGETHER AND DISPLAY ON THE UI.

| UI | EDGE |
|---|---|
| 1) PASS TRADE STATE TO IFRAME FROM INITIAL BUBBLE SCREEN<br>  A) UNKNOWN – PERHAPS HIDDEN IFRAMES | 1) PLAYER VALUATION:<br>  A) CDN<br>  B) API TO GET TEAM POSITION SLOTS<br>  C) MROSTER VIEW<br>2) TRADABILITY:<br>  A) IN MEMORY FROM TEAM PAIRING<br>  B) CONFIGURATION PARAM FOR RISK<br>  C) CDN TEAM DESCRIPTION MEASURES<br>3) TRADABILITY RISK:<br>  A) CDN<br>  B) MROSTER VIEW |

*Fig. 11*
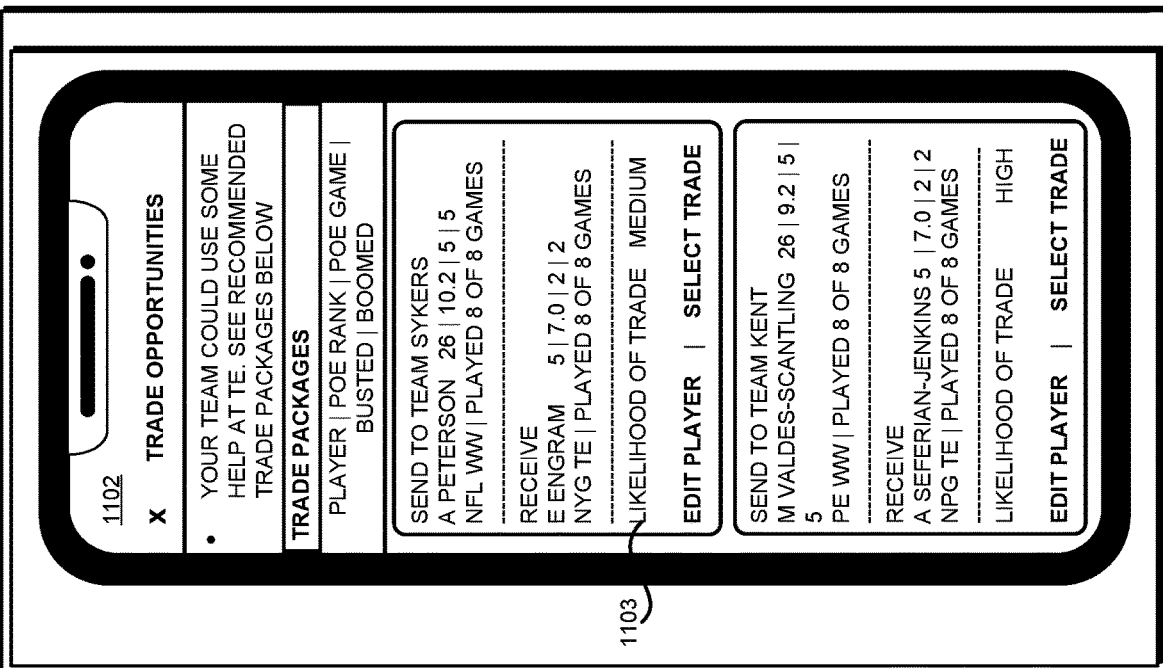
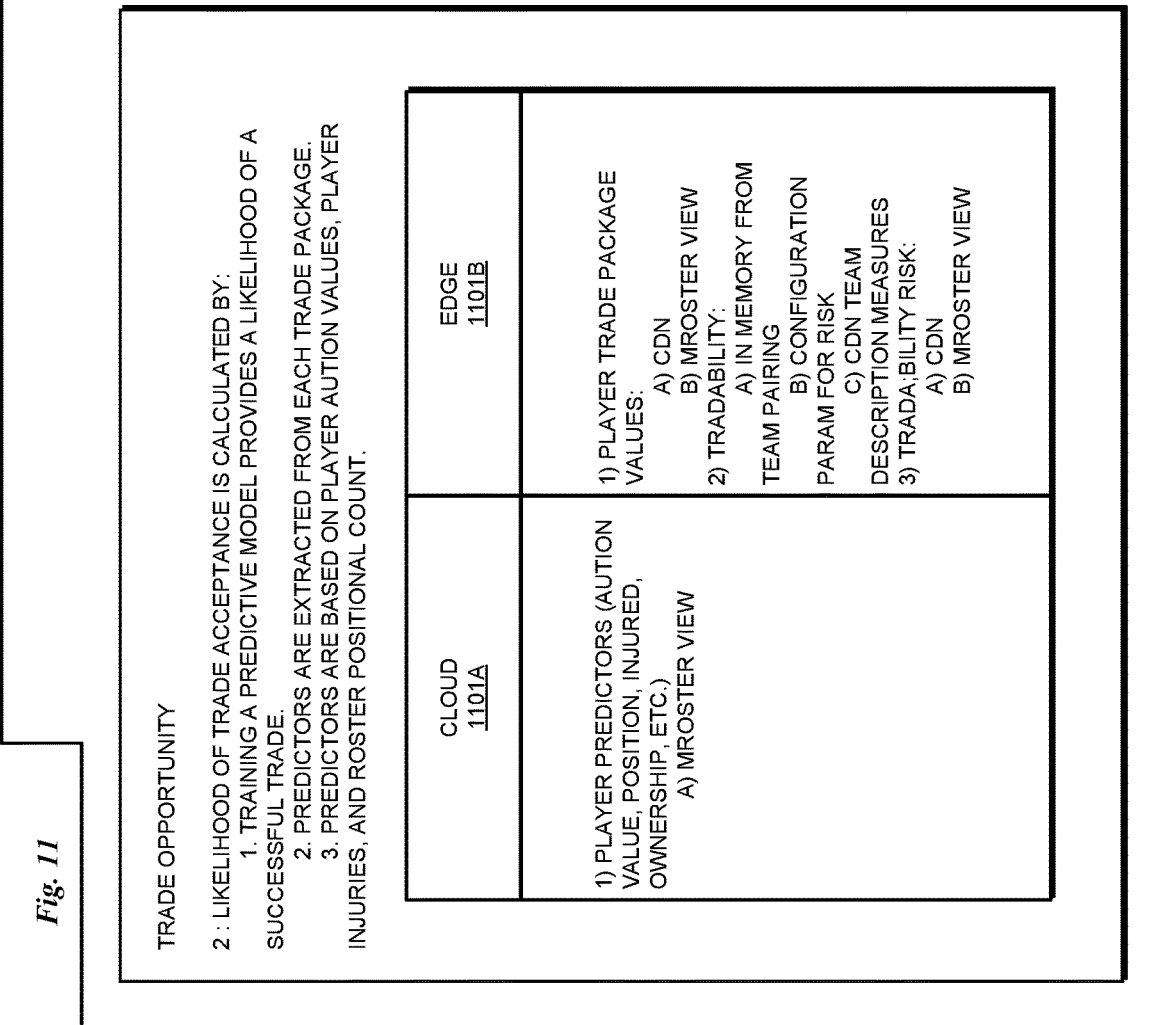

AUTONOMIC CLOUD TO EDGE COMPUTE ALLOCATION IN TRADE TRANSACTIONS

TECHNICAL FIELD

The present invention relates generally to data processing systems, and more particularly, to autonomic cloud to edge compute allocations.

BACKGROUND

Large scale optimization problems with many different combinations require significant amounts of computational power to explore feasible solutions. Under heavy cloud network traffic, the raw amount of service demand can commonly overwhelm and exhaust an origin server.

Edge computing relates to deployment of data-handling activities or other network compute and processing operations away from centralized servers and always-connected network segments, and toward individual sources of data capture, such as endpoints associated with end users including laptops, tablets or smartphones. Thus, edge computing refers to data processing power at the edge of a network instead of centralizing that processing power in a cloud or a central data warehouse. By processing data closer to the source and prioritizing traffic, edge computing reduces the amount of data flowing to and from the primary network, leading to lower latency, faster overall speed and increased system responsiveness to end user requirements.

SUMMARY

The illustrative embodiments provide a method, system, and computer program product. An embodiment includes calculating, based on an expected return associated with each player on each of a plurality of teams in a fantasy sports league, a valuation for each player. An embodiment includes determining a positional need for each of the plurality of teams in the fantasy sports league. An embodiment includes determining, based on the valuation for each player and the positional need for each team, one or more players to include in a trade with another team of the plurality of teams.

An embodiment includes a computer usable program product. The computer usable program product includes one or more computer-readable storage devices. Program instructions stored on at least one of the one or more storage devices are executable in one or more processors to provide for determining, based on a valuation for each player and a positional need for each team of a plurality of teams in fantasy sports league, one or more players to include in a trade with another team of the plurality of teams.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide for determining, based on a valuation for each player and a positional need for each team of a plurality of teams in fantasy sports league, one or more players to include in a trade with another team of the plurality of teams.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts an illustrative embodiment of team pairing in accordance with a sports team fantasy league;

FIG. 10 depicts an illustrative embodiment related to a prospective trade opportunity within a sports team fantasy league;

FIG. 11 depicts an illustrative embodiment related to a likelihood of acceptance of a prospective trade opportunity within a sports team fantasy league.

DETAILED DESCRIPTION

Figure 1:
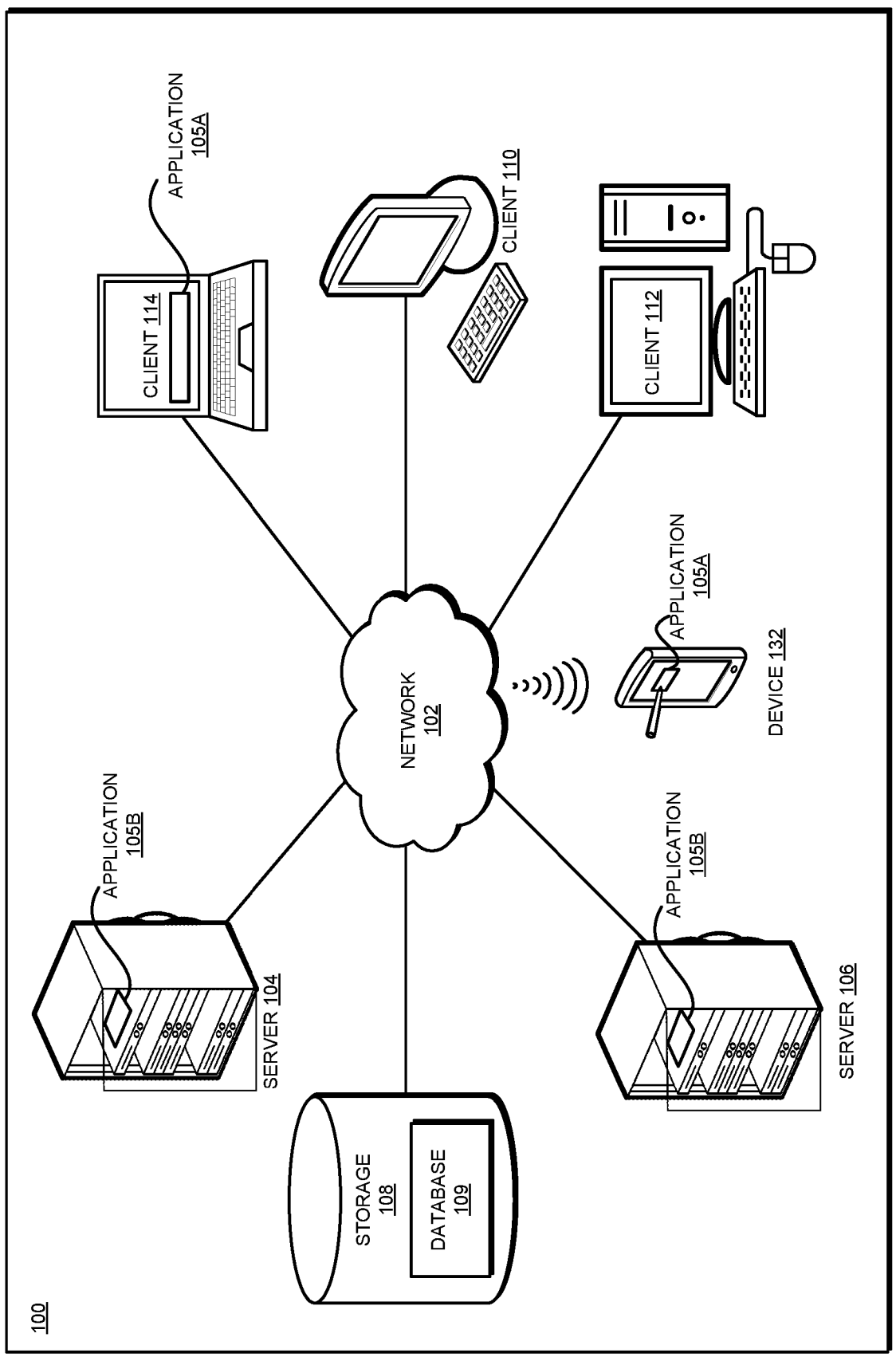
FIG. 1 depicts a block diagram of a network of data processing systems in which illustrative embodiments of cloud to edge compute allocations are implemented.

The illustrative embodiments recognize that there is a need for providing a user or a given user group with solutions described herein that increase computing efficiencies and responsiveness to users by autonomically allocating compute resources amongst cloud and edge computing devices, particularly in highly data- and processing-intensive context of identifying and fulfilling trade prospects in a sports team fantasy league.

Embodiments herein recognize that with traditional networks, including cloud computing networks, an end user device or other edge computing device sends information to a data center that may be hundreds of miles away. Data takes time to travel across large physical distances. As a result, processing, accessing and storage delays can occur. With edge computing, critical functions can be processed at the network's edge in real time. Data requiring less real time intensive, or secondary, processing can be processed in the cloud.

Among other technical advantages and benefits, embodiments herein provide autonomically shifting compute allocations amongst cloud and edge computing devices and systems. Embodiments herein also provide user interface features rendered at edge devices to a user, in a sports team fantasy league, in relation with identifying and implementing prospective player trades among opposing teams, taking into account a level of risk that would be deemed acceptable to the given user.

Other technical advantages and benefits described include, in embodiments, learning based on based on a shape of a multi-objective optimization pareto hull, creating and deploying lag and leading indicator variables that inform the upper and lower bounds of an optimization problem with bag size K, simulating suggested computing changes to validate optimal user outcomes, decision models to implement simulated changes, and autonomic shifting of computing from cloud to edge based on the specific computations required to change the pareto hull. And changing the edge versus cloud computation locations based on the spread in the pareto hull data.

Other existing approaches also have applicable limitations. For example, an example of a football sports fantasy league can have data and processing implications to the scale of 10 Million users per day, with hundreds of Petabytes of data served each week.

In the example of a football sports fantasy league, some embodiments herein propose a novel approach to optimize trade value (Valuation Value) while minimizing trade loss (Tradability) between two opposing teams within the league. The discovered trade packages are evaluated by a likelihood of acceptance by both teams. The final results will be displayed on a user experience for both mobile and desktop edge devices. The compute load of the system will be spread between cloud and edge. Several predictors will be precomputed on the cloud and available for access by the edge, while the majority of the core algorithms will run on the edge, in embodiments described herein.

Illustrative embodiments herein eliminate or minimize the latter problems and provide a mechanism for autonomically allocating processing and other resources amongst edge and cloud computing devices and system. In particular, multi-objective compute allocation optimization mechanisms described herein provide an end user at an edge device with responsive, efficient experience in engaging in sports team fantasy league player trades. Furthermore, the mechanisms described can be correlated with other compute allocation techniques and systems, edge and cloud computing devices, edge device user interfaces, storage, virtualized network computing, and other systems in relation to shifting optimal compute allocations amongst edge and cloud computing devices.

An embodiment can be implemented as a fantasy sports team player trade application constituted of any combination of hardware and software program instructions. The fantasy sports team player trade application implementing an embodiment can be configured as a modification of an existing server computing device or system, as a separate application that operates in conjunction with a server device, or some combination thereof.

A method of an embodiment described herein, when implemented to execute on a cloud or edge device or data processing system, comprises substantial advancement of the functionality of that device or data processing system to automonically allocate compute resources amongst cloud and edge devices and system.

The illustrative embodiments are described with respect to prospective player trades relating to sports team fantasy leagues via applications that are constituted of any combination of hardware and software program instructions, including compute allocation applications installed on server devices and systems, edge devices, physical CPU cores, virtual CPU, memory storage devices, data processing systems, virtual machines and container environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using an application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
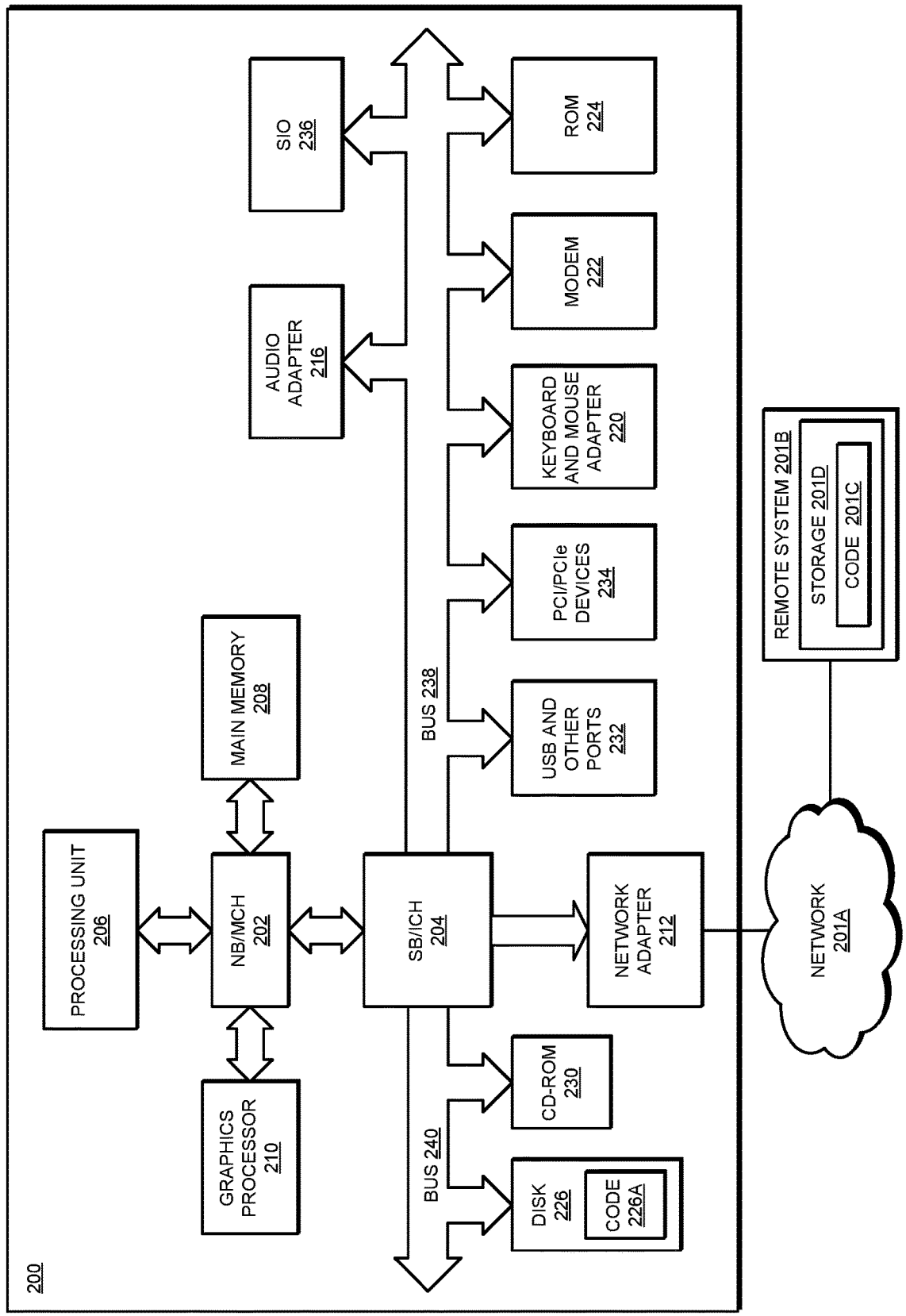
FIG. 2 depicts a block diagram of a data processing system in which illustrative embodiments are implemented.

With reference to the figures and in particular with reference to FIG. 1 and FIG. 2, these figures are example diagrams of data processing environments in which illustrative embodiments are implemented. FIG. 1 and FIG. 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments of cloud to edge compute allocations are implemented. Data processing environment 100 is a network of computers in which the illustrative embodiments are implemented and includes both cloud based and edge based compute resources and devices. Data processing environment 100 includes network 102. Network 102 is the medium used to provide communications links between various cloud and edge devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 and 132 are edge computing devices also coupled to network 102. A data processing system, such as server 104 or 106, or clients 112, 114 and 132 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Trade transaction applications 105A, 105B can be implemented in cloud and edge computing counterparts respectively in embodiments described herein. Trade transaction applications 105A, 105B are referred to collectively as trade transaction application 105 herein. Trade transaction application 105 can be comprised of any combination of hardware and software program instructions executable in one or more processors. Trade transaction application 105 can execute in servers 104 and 106, storage unit 108, and clients 112, 114 coupled to network 102 using wired connections, wireless communication protocols, or other suitable data connectivity. Clients 112, 114 may be, for example, a portable personal computer.

In the depicted example, server 104 provides data, such as boot files, operating system images, and applications to clients 112, 114. Clients 112, 114 and mobile device 132 may be edge computing client devices to server 104 in this example. Clients 112, 114 as well as device 132 may include their own data, boot files, operating system images, and applications. Data processing environment 100 may include additional servers, clients, and other devices that are not shown.

In the depicted example, cloud based data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as trade transaction application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIG. 1-2 may vary depending on the implementation. Other internal hardware or peripheral devices, such as flash memory, equivalent non-volatile memory, or optical disk drives and the like, may be used in addition to or in place of the hardware depicted in FIG. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
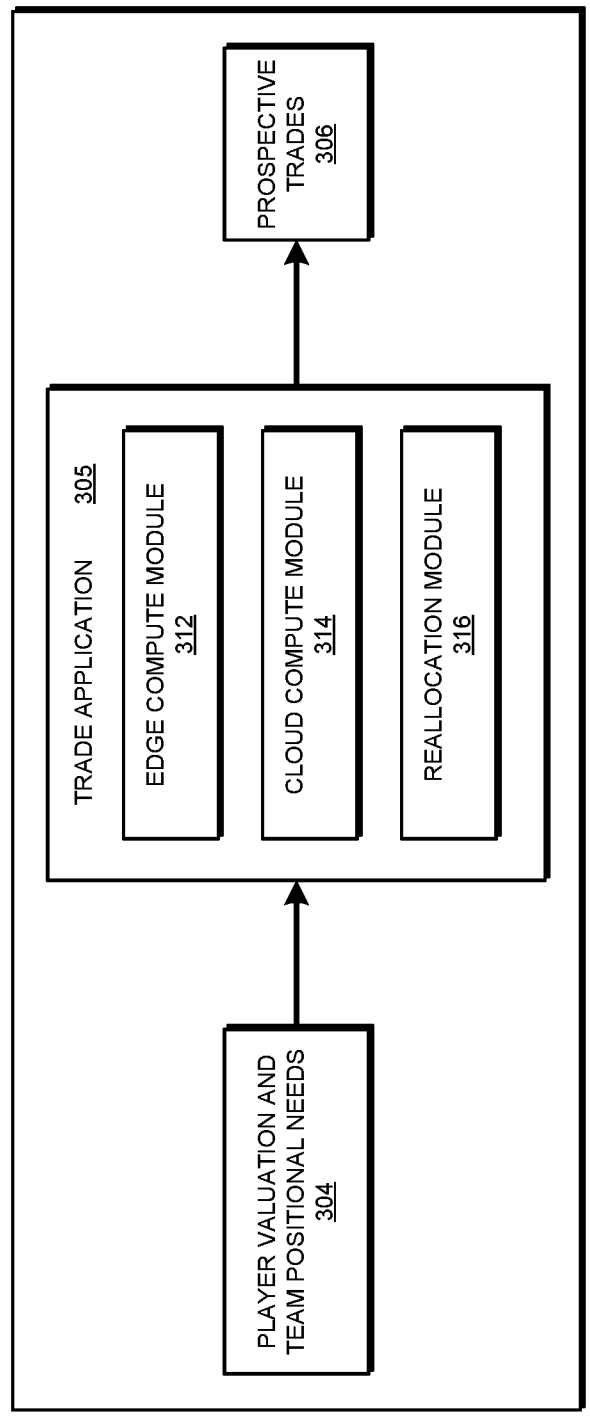
FIG. 3 depicts a block diagram of an example implementing illustrative embodiments of cloud to edge compute allocations.

FIG. 3 depicts a block diagram of an example implementing illustrative embodiments of cloud to edge compute allocations. In an embodiment in accordance with FIG. 3, trade application 305, implemented in edge and cloud computing device counterparts corresponding to trade transaction application 105 of the embodiment of FIG. 1, is installed on servers 104, 106. Trade transaction application 105 includes any combination of executable program instructions and hardware to implement edge compute module 312, cloud compute module 314 and reallocation module 314 for trade transactions based on autonomic reallocation of compute resources amongst cloud and edge computing devices. In some embodiments, trade application 305 comprises program instructions stored on one or more storage devices of server 104, 106 for execution by one or more processors. Trade application 305 operates based at least in part on player valuation and team positional needs 304 as input and generates prospective trades 306 as output in some embodiments.

Embodiments herein eliminate the problems of the existing solutions based at least in part upon autonomically shifting compute allocation amongst cloud and edge devices. In accordance with embodiments described herein, among other technical advantages and benefits, the mechanisms described herein can be correlated with other cloud and edge compute devices, storage, cloud virtual machines, trade transaction types, compute optimization techniques and algorithms, including multi-objective optimizations, in determining trade transactions.

Figure 4:
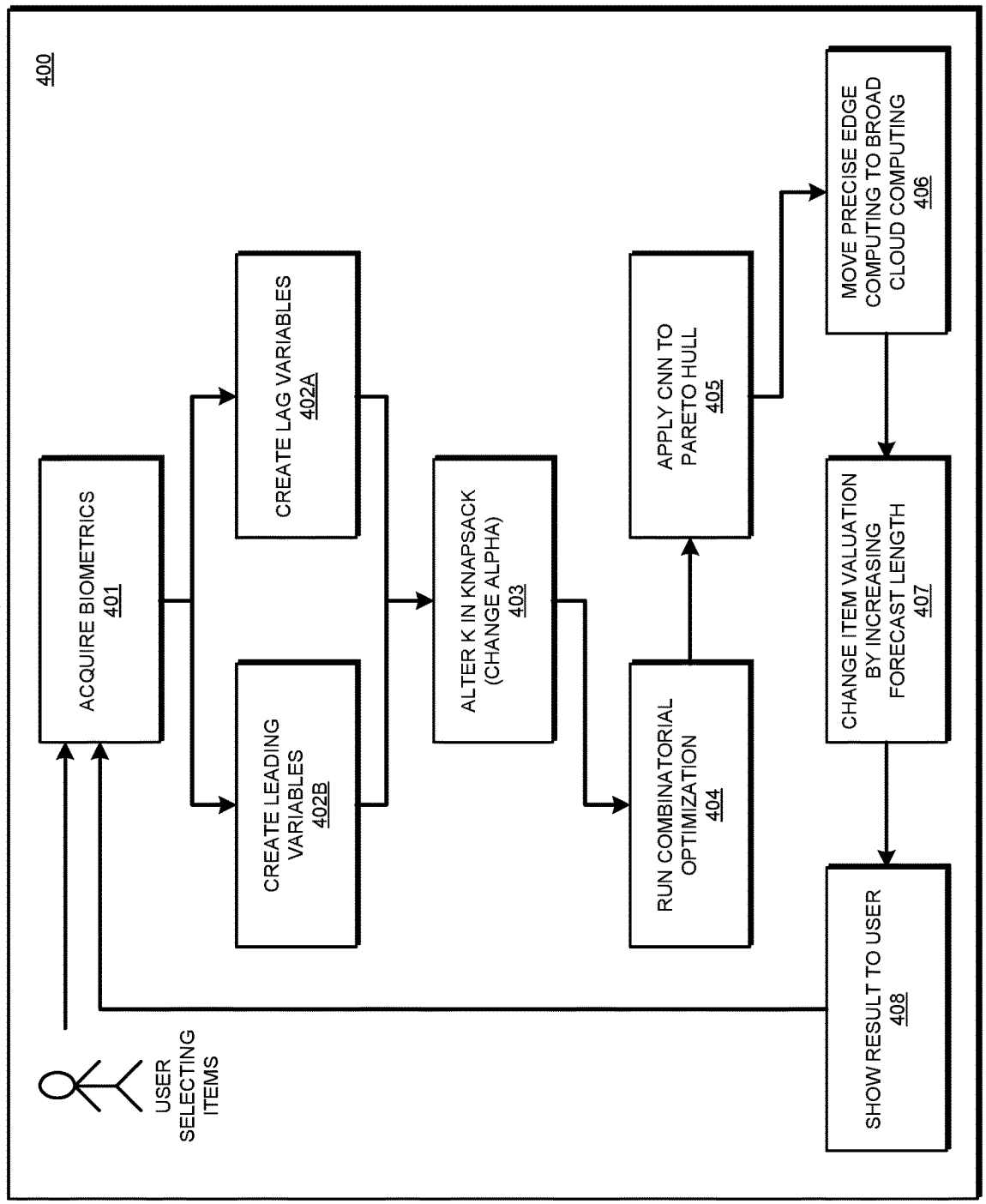
FIG. 4 depicts an illustrative embodiment of an algorithm for implementing cloud to edge compute allocations.

FIG. 4 depicts an illustrative embodiment of an algorithm 400 for implementing cloud to edge compute allocations. At block 401, acquiring user biometrics at a user edge device for identifying a given user or user device. The user biometrics includes physiological biometric data of the user, so that the user interface rendered in relations to the trade transaction application can be tailored to the user, for example, a younger user.

At blocks 402A,402B, the leading and lag indicator variables are chosen to model a risk level of a user, and a user's behavior in relation to the user's risk appetite. At block 402A, lag variables are selected based on historical or accumulative information and is based on multiple regression models in one embodiment. At block 402B, leading variables are based on future or forecast information, in variable future timeframes, and also based on multiple regression models in one embodiment.

At block 403, the alpha variable constitutes a weight predictor in an artificial intelligence (AI) or neural network predictive model, which can be a convolution neural network (CNN) in one embodiment. In particular, the knapsack represents a bounding of the risk level that might apply to, or be acceptable to, a particular user in accordance with the alpha variable. In an example embodiment of a sports fantasy league trade transaction described herein, the AI predictive model is based at least in part on extracting a set of predictors in accordance with a prospective player trade. The set of predictors, in such embodiment, is based at least partly on a player auction value, a player injury status, and a team roster positional count associated with each of the plurality of teams of the sports fantasy league.

At block 404, the combinatorial optimization estimates a total number of items, solutions or selections that can "fit" into the user's knapsack representation in block 403. The total combination of items is based on a valuation and cost of the items given the boundary of a given user's knapsack representation at block 403, in one embodiment. At block 405, a pareto hull technique is applied to estimate, of all the solutions determined from the previous steps, which ones constitute the most optimal solutions for the given user, taking into account the user's risk level attributes.

At block 406, depending on uniqueness of the optimal solutions, in one embodiment as indicated by how spatially separated the identified solutions are within the pareto hull rendering, shifting compute allocation between edge and cloud compute devices. At block 407, increasing a forecast window, for example related to the leading variables of block 402B, to change a shape of the pareto hull. Thus, enabling computation of prospective trade solutions that are even further spatially separated, representing more distinctive solutions to present a user at block 408. An example embodiment includes calculating, at a user interface of an edge computing device, a likelihood of trade acceptance associated with a prospective trade, and presenting a prospective trade when the likelihood of acceptance is calculated as being greater than a predetermined threshold likelihood.

Figure 5:
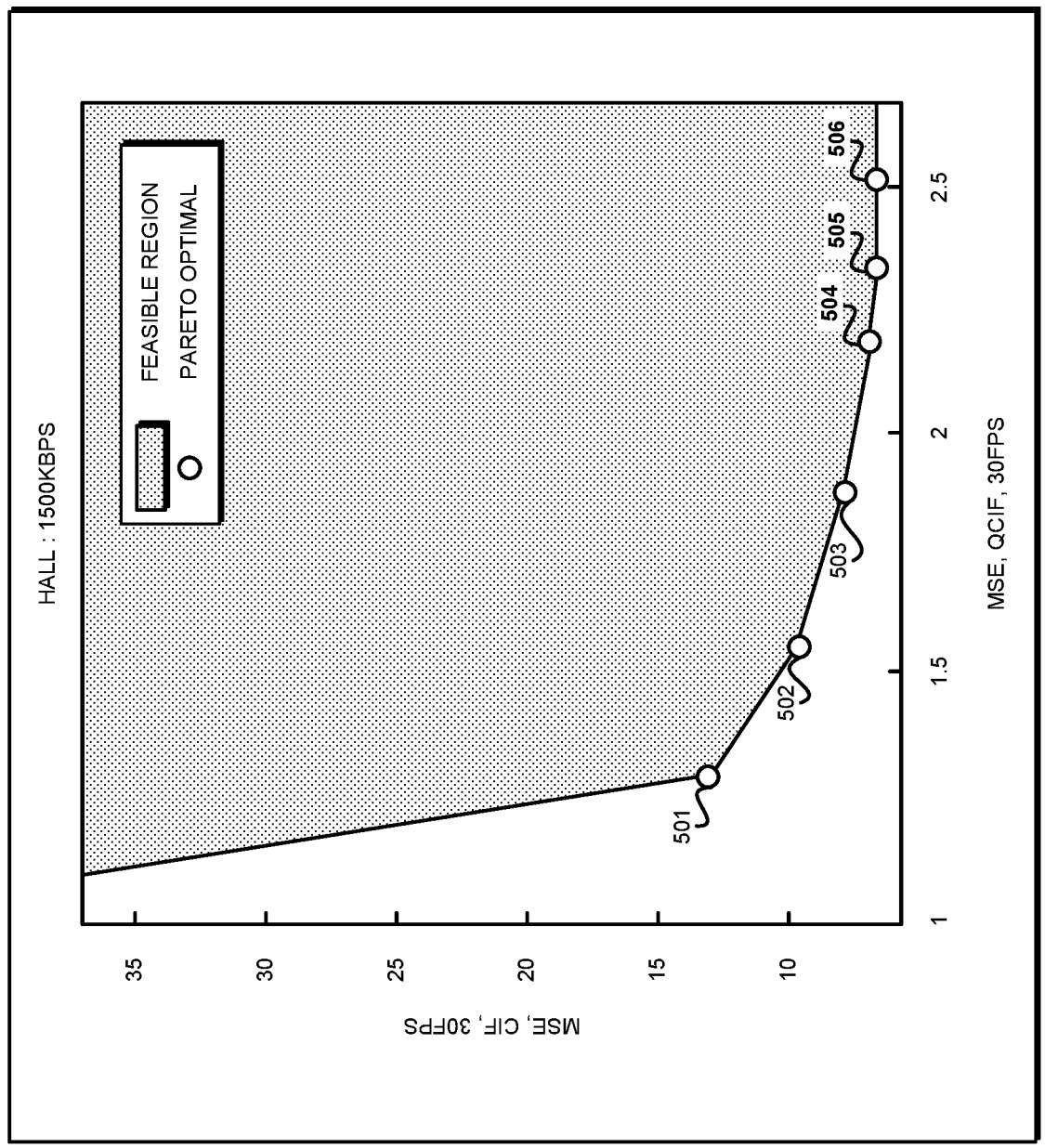
FIG. 5 depicts an illustrative embodiment of determining optimal cloud to edge compute allocations in accordance with a pareto hull based multi-objective optimization.

FIG. 5 depicts an illustrative embodiment of determining optimal cloud to edge compute allocations in accordance with a pareto hull based multi-objective optimization. In some embodiments of the pareto hull depiction, solutions 501-506 represent identified optimal solutions, constituting potential trade prospects in one embodiment, of varying uniqueness for presentation to a user. An amount of spatial separation between any pair of adjacent solutions within solution set 501-506 indicates a degree of uniqueness or distinctiveness between that given pair of solutions. Thus, a user is presented with more distinctive or different prospective trades as the degree of spatial separation between any two adjacent solutions increases in such embodiments.

Figure 6:
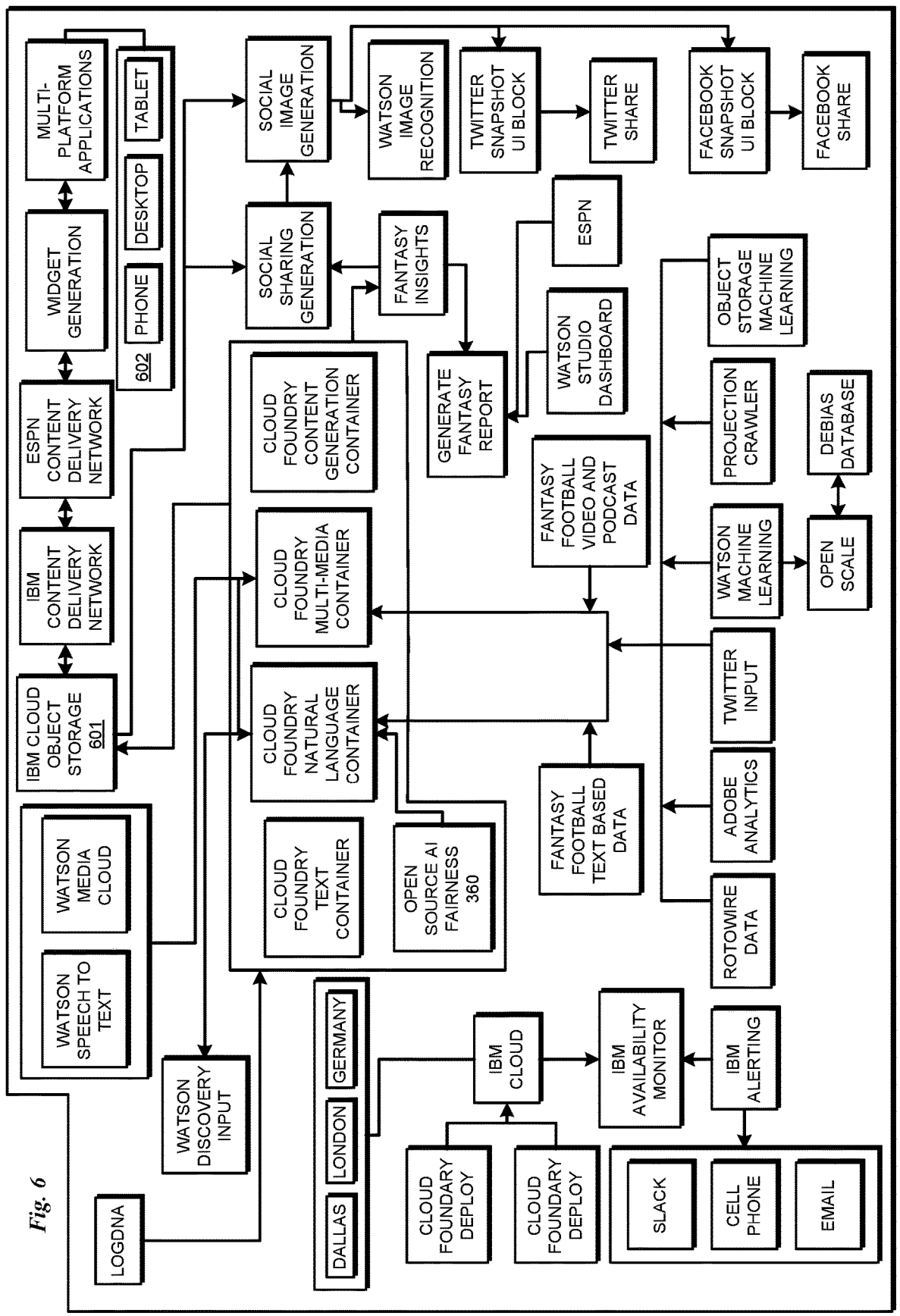
FIG. 6 depicts an architecture for a sports team fantasy league in an illustrative embodiment.

FIG. 6 depicts an illustrative embodiment of an architecture for a sports team fantasy league. Cloud computing devices or components 601 are communicatively coupled with various edge computing devices 602 across various cloud- and edge-based communication platforms.

Figure 7:
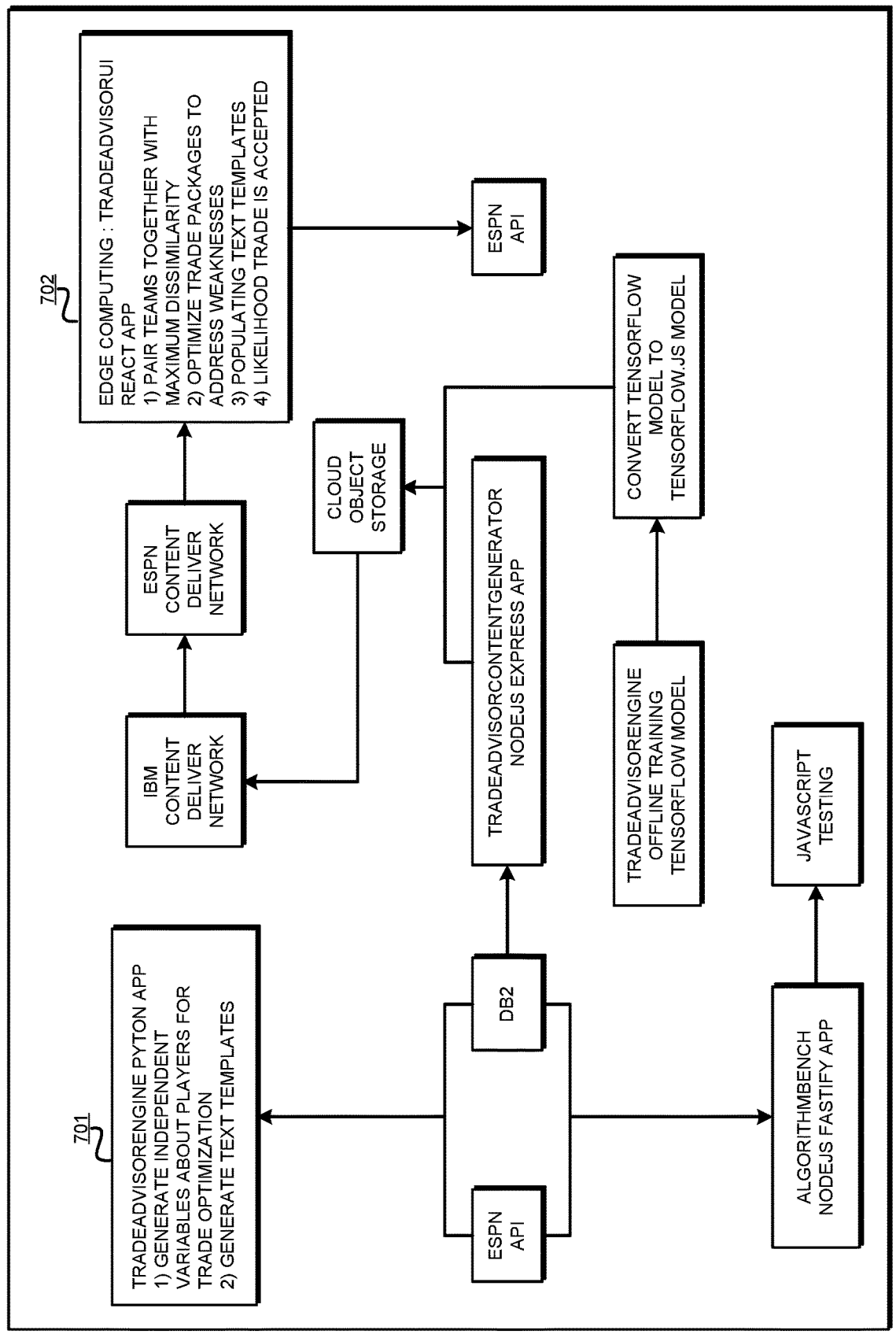
FIG. 7 depicts an illustrative embodiment of compute allocations for a sports team fantasy league including example cloud and edge allocations.

FIG. 7 depicts an illustrative embodiment of compute allocations for a sports team fantasy league including example cloud and edge allocations. Cloud compute allocations enable cloud compute functions 701 in one embodiment. Edge compute allocations enable edge compute functions 702 in the embodiment of FIG. 7.

Figure 8:
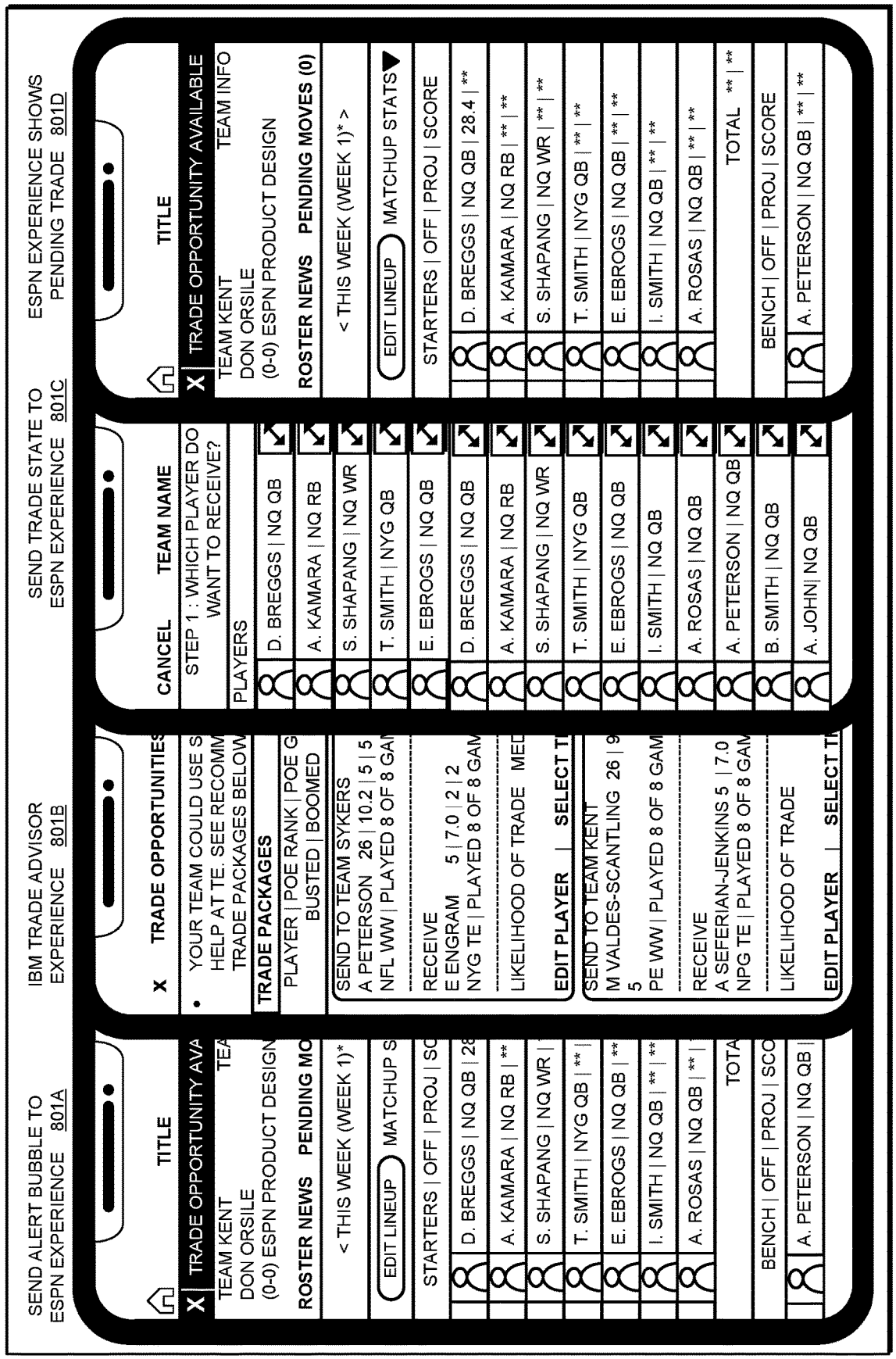
FIG. 8 depicts an illustrative embodiment of example user interfaces rendered at an edge device.

FIG. 8 depicts an illustrative embodiment of example user interfaces rendered at an edge device. User interfaces 801A-801B depict various display rendering of trade opportunities available to a user at an edge device.

FIG. 9 depicts an illustrative embodiment of team pairing in accordance with a sports team fantasy league. Team pairing can be based on compute allocations between cloud device 901A and edge device 901B, to provide trade prospects in view of player and roster trades that maximize overall value to the sports fantasy league, in an embodiment.

FIG. 10 depicts an illustrative embodiment related to prospective trade opportunities within a sports team fantasy league. Team pairing proposes player trades 1001 with opposing teams, based on compute allocations between cloud and edge devices, with results or user recommendations presented at a user interface 1002 of an edge device.

FIG. 11 depicts an illustrative embodiment related to a likelihood of acceptance of a prospective trade opportunity within a sports team fantasy league. The likelihood of trade acceptance is calculated based on compute allocations amongst cloud device 1101A and edge device 1101B. In the embodiment depicted, the likelihood of trade acceptance 1103 is presented at a user interface 1102 of an edge device.

Figure 12:
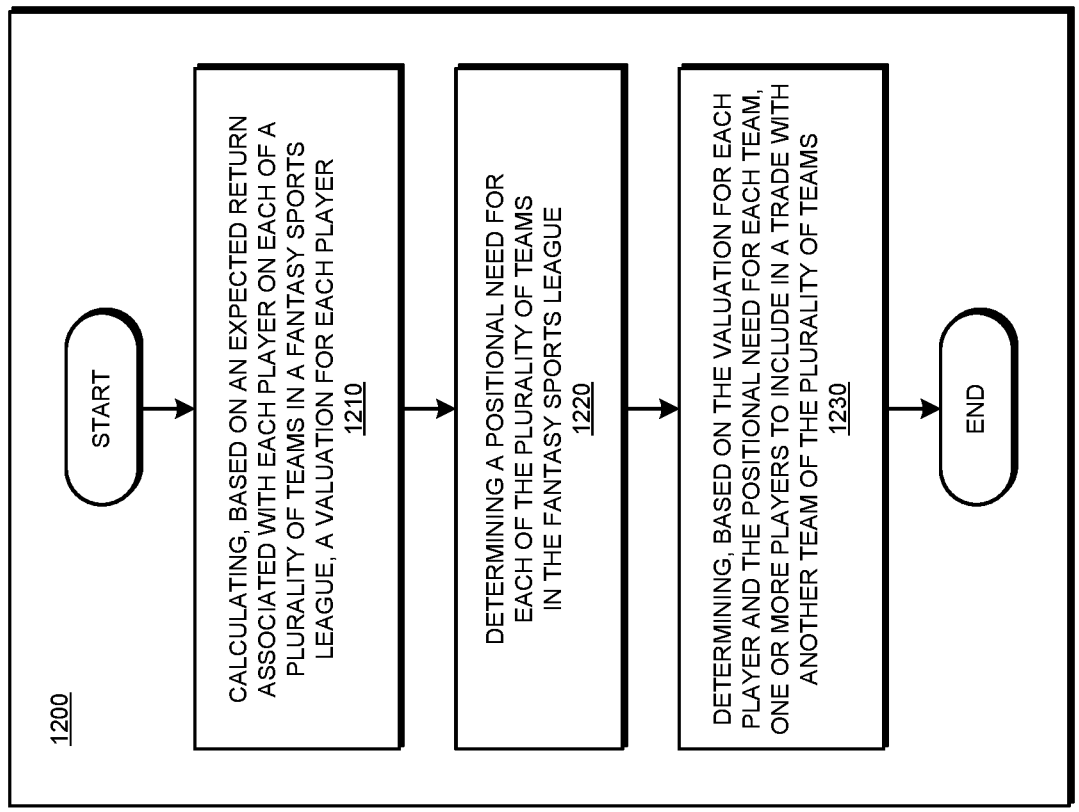
FIG. 12 depicts a flowchart, in an illustrative embodiment, of determining a prospective trade based on optimal cloud to edge compute allocations.

FIG. 12 depicts a flowchart, in an illustrative embodiment 1200, of determining a prospective trade based on optimal cloud to edge compute allocations.

At block 1210, calculating, based on an expected return associated with each player on each of a plurality of teams in a fantasy sports league, a valuation for each player.

At block 1220, determining a positional need for each of the plurality of teams in the fantasy sports league.

At block 1230, determining, based on the valuation for each player and the positional need for each team, one or more players to include in a trade with another team of the plurality of teams.

Figure 13:
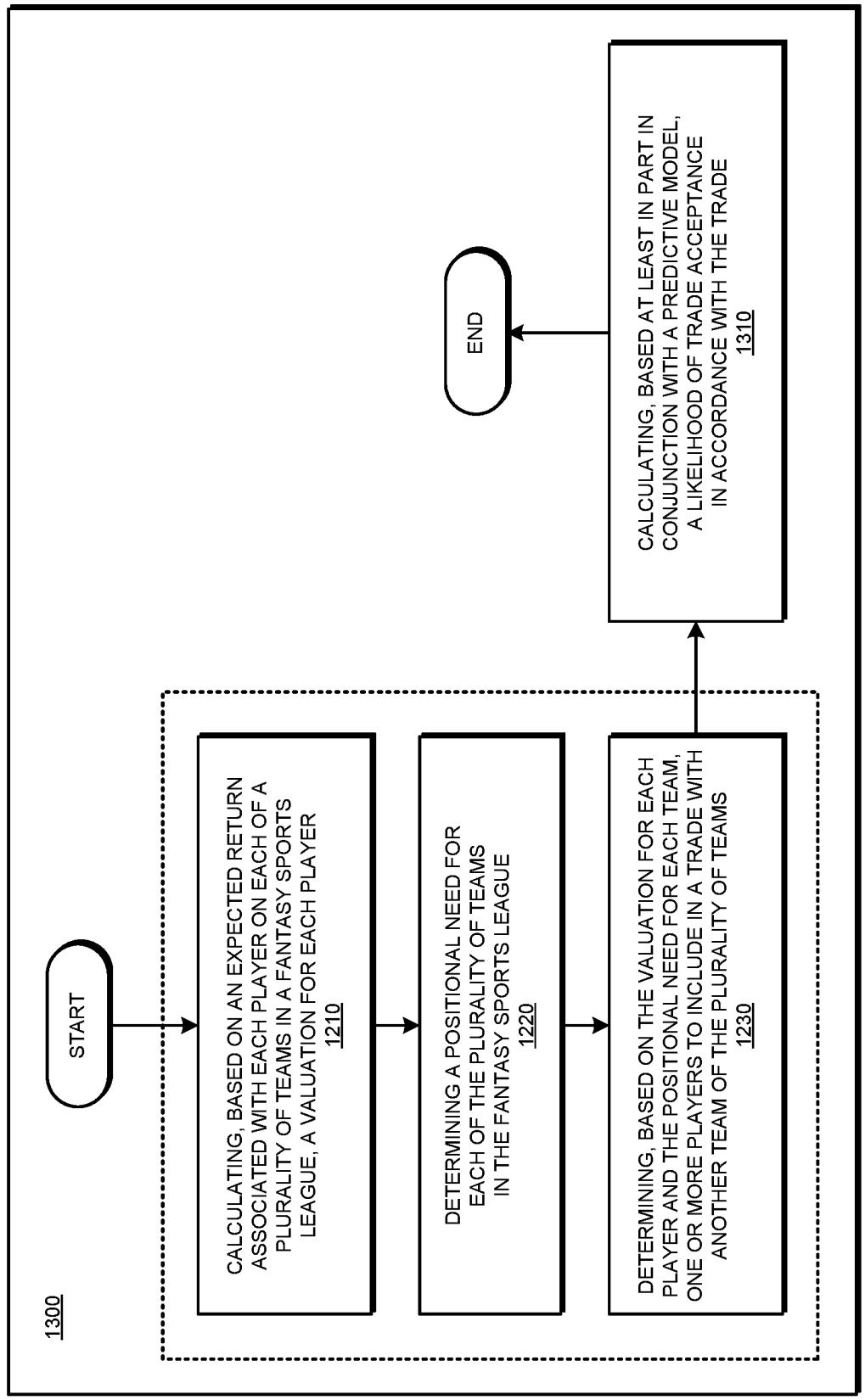
FIG. 13 depicts a flowchart of another an illustrative embodiment of determining a prospective trade based on optimal cloud to edge compute allocations.

FIG. 13 depicts a flowchart of another an illustrative embodiment 1300 of determining a prospective trade based on optimal cloud to edge compute allocations. In some embodiments, steps described in reference to FIG. 13 can be performed in conjunction with the steps described with regard to FIG. 12.

At block 1310, calculating, at least in part in conjunction with a predictive model, a likelihood of trade acceptance in accordance with the trade. The likelihood of trade acceptance as determined can be presented, in embodiments, to an end user edge device such as a mobile phone or mobile computing device. An embodiment includes presenting, at a user interface of an edge computing device, at least one trade acceptance when the likelihood of trade acceptance associated therewith is greater than a predetermined threshold likelihood.

In some embodiments, the method is initiated in one or more cloud computing devices. A compute allocation is autonomically shifted amongst the cloud computing device and at least one edge computing device in performing at least a portion of the method. Autonomically shifting the compute allocations is based at least in part on a pareto hull multi-objective optimization technique, and in some embodiments in particular, shifting the compute allocations is based on computations that change a shape of the pareto hull. In the embodiment of shifting compute allocations between cloud and edge devices in fantasy league sports teams as described herein, the autonomically shifting is responsive, at least in part, to determining a team roster positional need. In such embodiments, based on computations at the at least one edge device as a result of the autonomic shifting, determining one or more players to include in the prospective trades.

Thus, a computer implemented method, system or apparatus, and computer program product are provided in the illustrative embodiments for autonomic cloud to edge compute allocations for prospective trade transactions. Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   calculating, by an edge computing device, based on an expected return associated with each player on each of a plurality of teams in a fantasy sports league, a valuation for each player;
   determining, by the edge computing device, a positional need for each of the plurality of teams in the fantasy sports league;
   determining, by the edge computing device, a first trade solution based on the valuation for each player and the positional need for each team, wherein the first trade solution comprises one or more players to include in a trade with another team of the plurality of teams; and
   allocating, by the edge computing device, an amount of compute resources to a cloud computing device based on a comparison of the first trade solution to a second trade solution.

2. The computer-implemented method of claim 1 further comprising:
   calculating, at least partly in conjunction with an artificial intelligence (AI) predictive model, a likelihood of trade acceptance in accordance with the trade.

3. The computer-implemented method of claim 2 wherein the AI predictive model is based at least in part on extracting a set of predictors in accordance with the trade, the set of predictors being based at least partly on a player auction value, a player injury status, and a roster positional count associated with each of the plurality of teams.

4. The computer-implemented method of claim 2 further comprising presenting, at a user interface of an edge computing device, at least one trade acceptance responsive to the likelihood associated therewith being greater than a predetermined threshold likelihood.

5. The computer-implemented method of claim 1, further comprising:
   determining a third trade solution by the edge computing device in conjunction with the cloud computing device according to the amount of compute resources allocated to the cloud computing device.

6. The computer-implemented method of claim 5 wherein the comparison of the first trade solution to the second trade solution comprises determining, by the edge computing device, an amount of spatial separation between the first trade solution and the second trade solution on a pareto hull rendering.

7. The computer-implemented method of claim 6 wherein the calculating of the valuation for the first trade solution is based at least in part on a first forecast window, and wherein the method further comprises increasing the first forecast window to a second forecast window resulting in a change to a shape of the pareto hull.

8. The computer-implemented method of claim 7, wherein the allocating of the amount of compute resources comprises autonomically shifting, by the edge computing device, the amount of compute resources to the cloud computing device.

9. The computer-implemented method of claim 8 further comprising:
   determining, based on computations by the edge computing device, one or more players to include in the third trade solution in accordance with the autonomically shifted compute resources.

10. A computer usable program product comprising one or more computer-readable storage devices, and program instructions stored on at least one of the one or more storage devices, the program instructions when executed in one or more processors causing operations comprising:
    calculating, by an edge computing device, based on an expected return associated with each player on each of a plurality of teams in a fantasy sports league, a valuation for each player;
    determining, by the edge computing device, a positional need for each of the plurality of teams in the fantasy sports league;
    determining, by the edge computing device, a first trade solution based on the valuation for each player and the positional need for each team, wherein the first trade solution comprises one or more players to include in a trade with another team of the plurality of teams; and
    allocating, by the edge computing device, an amount of compute resources to a cloud computing device based on a comparison of the first trade solution to a second trade solution.

11. The computer usable program product of claim 10 further comprising instructions when executed in the processor causing operations comprising:
    calculating, at least partly in conjunction with an artificial intelligence (AI) predictive model, a likelihood of trade acceptance in accordance with the trade.

12. The computer usable program product of claim 10 wherein the AI predictive model is based at least in part on extracting a set of predictors in accordance with the trade, the set of predictors being based at least partly on a player auction value, a player injury status, and a roster positional count associated with each of the plurality of teams.

13. The computer usable program product of claim 11 further comprising instructions when executed in the processor causing operations comprising presenting, at a user interface of an edge computing device, at least one trade acceptance responsive to the likelihood associated therewith being greater than a predetermined threshold likelihood.

14. The computer usable program product of claim 10, further comprising:
    determining a third trade solution by the edge computing device in conjunction with the cloud computing device according to the amount of compute resources allocated to the cloud computing device.

15. The computer usable program product of claim 14 wherein the comparison of the first trade solution to the second trade solution comprises determining, by the edge computing device, an amount of spatial separation between the first trade solution and the second trade solution on a pareto hull rendering.

16. The computer usable program product of claim 15 wherein the calculating of the valuation for the first trade solution is based at least in part on a first forecast window, and wherein the operations further comprise increasing the first forecast window to a second forecast window resulting in a change to a shape of the pareto hull.

17. The computer usable program product of claim 16, wherein the allocating of the amount of compute resources comprises autonomically shifting, by the edge computing device, the amount of compute resources to the cloud computing device.

18. The computer usable program product of claim 17 further comprising instructions when executed in the processor causing operations comprising determining, based on computations by the edge computing device, one or more players to include in the third trade solution in accordance with the autonomically shifted compute resources.

19. A computer system comprising one or more processors, one or more computer-readable memories, and one or more computer-readable storage devices, and program instructions stored on at least one of the one or more storage devices for execution by at least one of the one or more processors via at least one of the one or more memories, the program instructions when executed in the one or more processors causing operations comprising:

calculating, by an edge computing device, based on an expected return associated with each player on each of a plurality of teams in a fantasy sports league, a valuation for each player;

determining, by the edge computing device, a positional need for each of the plurality of teams in the fantasy sports league;

determining, by the edge computing device, a first trade solution based on the valuation for each player and the positional need for each team, wherein the first trade solution comprises one or more players to include in a trade with another team of the plurality of teams; and allocating, by the edge computing device, an amount of compute resources to a cloud computing device based on a comparison of the first trade solution to a second trade solution.

20. The computer system of claim 19, the program instructions when executed in the processor causing operations further comprising calculating, at least partly in conjunction with an artificial intelligence (AI) predictive model, a likelihood of trade acceptance in accordance with the trade.

\* \* \* \* \*